United States Patent Office 3,188,310
Patented June 8, 1965

3,188,310
PROCESS FOR PREPARING PYROPHOSPHATE NUCLEOTIDES
Teruaki Mukaiyama, Tokyo, and Tsujiaki Hata, Yokosuka-shi, Japan, assignors to Asahi Kasei Kogyo Kabushiki Kaisha, Osaka, Japan, a corporation of Japan
No Drawing. Filed Apr. 1, 1963, Ser. No. 269,718
Claims priority, application Japan, Mar. 31, 1962, 37/12,129
3 Claims. (Cl. 260—211.5)

This invention relates to processes for preparing pyrophosphates.

The invention is concerned primarily with processes for preparing pyrophosphates from phosphates and phosphites in the presence of α-mono- or di-halogen derivatives of active methylene compounds.

The process of this invention follows the following general equation:

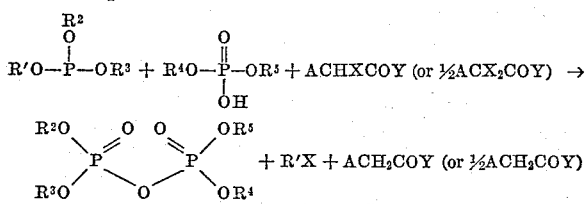

Wherein

R' is alkyl or aralkyl radicals.
$R^2$ and $R^3$ are alkyl, aralkyl radicals or aryl radicals or their substituents.
$R^4$ is hydrogen or alkyl, aralkyl or aryl radicals.
$R^5$ is radicals from any organic compound, or phosphate radicals.
A is an atomic group with a large electro-negativity such as CN, $NO_2$, $R^6NHCO$, $COOR^6$, etc.
X is halogen (Br, Cl, I).
Y is $NHR^6$ or $OR^6$.
and
$R^6$ is hydrogen or alkyl, aralkyl or aryl radicals.

As will be apparent from the above formula, the process of this invention includes not only the preparation of nucleoside poly-phosphates such as adenosine di- or triphosphate, uridine di- or tri-phosphate, carbohydrates polyphosphates which are important biochemically and pharmaceutically, but also the preparation of several phosphorylating agents such as tetraethyl pyrophosphate or tetra(p-nitrophenyl)pyrophosphate.

For the preparation of pyrophosphates from phosphates, various attempts have been made by using carbodiimides, ketoxime-sulfonates, isocyanates, phosphoramidates. These methods, however, have much difficulty in being applied commercially, because they involve, complex processes and the difficult removal of by-products. By these methods, only symmetrical pyrophosphates are prepared.

It has been also well known that the enolphosphates formed from trialkyl phosphites and α-haloketones or -α-haloaldehydes by the Perkow reaction does not further react with the trialkyl phosphites but reacts exclusively with nucleophilic phosphates to make pyrophosphates. Any of the enol-phosphates obtained by the Perkow reaction up to the present time, however, has not been applied industrially to prepare pyrophosphates because they are prepared under severe conditions and are sluggish toward nucleophilic reagents (J. F. Allen and O. H. Johnson, J. Am. Chem. Soc., 77, 2871 (1955)). The inventors have recently found that the enol-phosphate prepared from triethyl phosphite and ethyl α-chloroacetone has slight reactivity toward mono- or di-ethyl phosphate and make tetraethylpyrophosphate (55% yield) under the presence of a catalytic amount of boron fluoride at 100° C. for 1 hour. The enol-phosphate, however, does not have enough reactivity to make pyrophosphates from other less reactive phosphates.

This invention is primarily concerned with commercial methods to prepare the pyrophosphates of naturally occurring compounds such as carbohydrates, nucleosides, vitamins, etc., which are important biochemically and pharmaceutically.

This invention concerns the processes for the preparation of various pyrophosphates in quantitative yield by reacting phosphates.

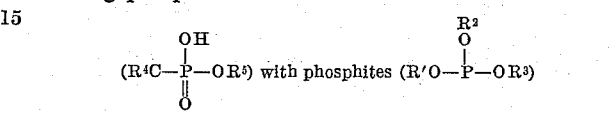

in the presence of mono- or di-halogen derivatives of active methylene compounds and to prepare then pyrophosphates

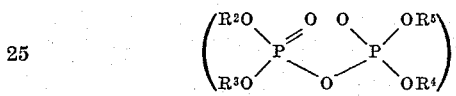

quantitatively. The chemical reaction of this invention is assumed to proceed as follows:

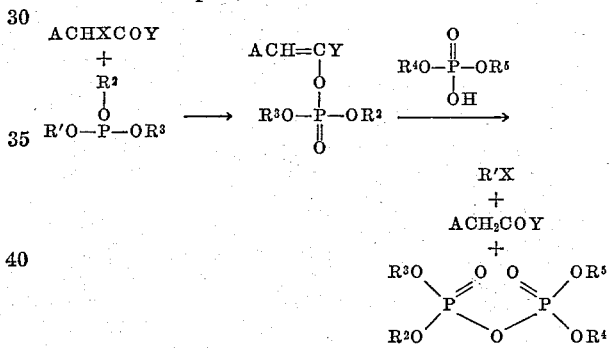

The reaction proceeds through the initial formation of the enol-phosphates by the interaction of mono- or dihalogen derivatives of active methylene compounds with phosphites followed by the attack of nucleophilic phosphates to form pyrophosphates.

As the above phosphites in this invention, trialkyl phosphites consisting of methyl, ethyl, n- or iso-propyl or n- or iso-butyl, or tribenzyl phosphite are generally used, because they are inexpensive. In some purpose, the phosphites substituted by different groups such as monoethyl bis(p-nitrophenyl) phosphite are used.

As the halogen derivatives of active methylene compounds in this invention, any of the halogens may be employed. Generally, bromine or chlorine substituents of cyanoacetamide malonamide, alkyl cyanoacetate (wherein alkyl is $C_1$–$C_4$) or N-cyclohexyl cyanoacetamide are suitable.

As the phosphates, mono- or di-alkyl phosphates consisting of methyl, ethyl, n- or iso-propyl, or n- or isobutyl, aralkyl phosphates such as mono- or di-benzyl phosphate, aryl phosphates, such as mono- or di-phenyl, monoor bis-p-nitrophenyl, mono- or di-p-chlorophenyl phosphate, carbohydrate phosphates such as glucose, fructose, ribose phosphates, nucleoside phosphates such as 5'-guanylic acid, 5'-adenylic acid, 3'-uridylic acid, etc., or the phosphates of sterols, terpene alcohols or vitamins are used.

As will be apparent from the general formula, when phosphites and phosphates have the same radicals, symmetrical pyrophosphates are obtained ($R_2=R_3=R_4=R_5$). On the other hand, if phosphites and phosphates have different radicals, unsymmetrical pyrophosphates are obtained exclusively ($R_2{\neq}R_3{\neq}R_4{\neq}R_5$). By this process, therefore, both of symmetrical and unsymmetrical pyrophosphates are prepared without difficulty. Those which prepare unsymmetrical pyrophosphates are, especially very important since most of naturally occurring pyrophosphates are unsymmetrical.

Pyrophosphate bonds can also be elongated by repeating this reaction, for example 5'-adenosine triphosphate is devived from 5'-adenosine monophosphate by pyrophosphonylating twice with some of the phosphites such as dibenzyl or diphenyl phosphites followed by hydrogenolysis.

In carrying out this invention, generally, one mole of the above phosphites and one mole of the above phosphates are dissolved in the solvent in different containers, and to either of which one or more kinds of the above halogen derivatives of the active methylene compounds is added in equivalent amount to halogen. These solutions are mixed at a suitable temperature and kept for a suitable period at room temperature. After filtering off a white precipitate which is an active methylene compound, the pyrophosphates are collected by distillation, solvent extraction or their combination.

The active methylene compounds filtered off are recovered at 90–95% yield and re-halogenated for subsequent use for the same purpose.

The reaction condition such as the reaction time and the reaction temperature required for this reaction is a function of reactants, a period of 1–2 hours at room temperature being required when the reactive reactants such as methyl, ethyl or phenyl phosphate are employed. When less reactive reactants such as the phosphates of carbohydrates, nucleosides or vitamins are employed, however, a period of 24–48 hours at room temperature is suitable.

For carrying out this invention, any solvent which is inactive to the enol-phosphates formed by the Perkow reaction may be used. Generally, a solvent easily dissolving the reactant such as ether, benzene, dioxane, N-dimethyl formamide and tetrahydrofuran are employed. It is not necessary to dry these organic solvents before using, because water does not inhibit this reaction. Sometimes, the reaction can be effected in aqueous solution.

Most of the halogen substituents of active methylene compounds employed in this invention shown as the general formula $ACHXCOY$, $ACX_2COY$ are superior to ethyl monobromomalonate in the following respects.

(1) The Perkow reaction occurs more easily
(2) The enol-phosphate formed are more reactive to nucleophilic phosphates Furthermore, this invention has the advantage of preparing pyrophosphate by a one step process by reacting phosphates with phosphites in the presence of the halogen derivatives of active methylene compounds without isolating the intermediate "enol-phosphate" as compared for example to the method reported by Cramer and Goürtener, Chem. Ber., 91 7041, 1958, in which the "enol-phosphate" was isolated.

Compared with other condensation or dehydration methods, the present invention is preferable, because more easily produced phosphites are used and recovery and cyclization of the halogen derivatives of active methylene compounds can be effected more effectively.

In addition to the above, the invention can be applied to prepare unsymmetrical pyrophosphates in which most of the pyrophosphates are of naturally occurring compounds.

The following examples are illustrative of the invention:

*Example 1*

To 1.54 grams of diethyl phosphate and 1.63 grams of α-monobromocyanoacetamide in 150 ml. of ether at −50° C. were added dropwise 1.24 grams of trimethyl phosphite dissolved in 15 ml. of ether. After standing for 2 hours at room temperature, a white precipitate was filtered and ether and methylbromide are removed under vacuum. 2.4 grams (yield 92%) of dimethyl diethyl pyrophosphate were obtained by distillation (B.P. 100–106° C./0.004 mm.).

*Example 2*

From 1.54 grams of diethyl phosphate, 1.22 grams of α-di-bromocyanoacetamide and 1.66 grams of triethyl phosphite, 2.7 grams (yield 94%, B.P. 135–136° C./1 mm.) of tetraethyl pyrophosphate were obtained by treating exactly as Example 1.

*Example 3*

From 1.54 grams of diethylphosphate, 1.2 grams of α-monochlorocyanoacetamide and 2.5 grams of tri-n-butyl phosphite, 3.3 grams (yield 96%, B.P. 114–118° C./0.02 mm.) of diethyl di-n-butyl pyrophosphate were obtained by treating exactly as in Example 1.

*Example 4*

The reaction of 1.26 grams of dimethyl phosphate with 1.3 grams of dibromomalonamide and 1.66 grams of triethylphosphite in ether was made at room temperature for 2 hours. Treatment of the reaction mixture exactly as in Example 1 produced 2.3 grams (yield 88%) of dimethyl diethyl pyrophosphate.

*Example 5*

The reaction of 1.02 grams of bis-(p-nitrophenyl)phosphate with 3.9 grams of dibromomalonamide and monoethyl bis-(p-nitrophenyl)phosphite in dioxane was conducted at room temperature for 5 hours. After white precipitate was filtered, removal of dioxane and ethyl bromide under vacuum gave crude tetra-(p-nitrophenyl)-pyrophosphate. Without purification, this product was used as a phosphorylating agent of 2',3'-o-isopropylidene guanosine to make guanosine-5'-phosphate.

*Example 6*

Treatment of 1.54 grams of diethyl phosphate with 1.66 grams of triethylphosphite and any one of the mixture of the following compounds:

0.77 gram of α-dichlorocyanoacetamide 2.10 grams of α-monoiodocyanoacetamide, 1.92 grams of ethyl α-monobromocyanoacetate, exactly as in Example 1 produced 1.9–2.3 grams (yield 66–88%) of tetraethyl pyrophosphate.

*Example 7*

To 2.45 grams of N-cyclohexyl α-monobromocyanoacetamide dispersed into 20 ml. of tetrahydrofuran was added dropwise a mixture of 1.24 grams of triethyl phosphite and 1.54 grams of diethyl phosphate at room temperature. After standing over-night, the reaction mixture was concentrated. Adding ether to filtrate, followed by concentration, 2.64 grams (yield 91%) to tetraethyl pyrophosphate were collected by distillation under vacuum.

*Example 8*

To a mixture of 0.35 gram of 5'-adenosine monophosphate, 0.66 gram of tribenzyl phosphite and 0.37 gram of n-butylamine dissolved in 25 ml. of N-dimethyl formamide were dropwise added 0.25 gram of α-monobromocyanoacetamide dissolved in 10 ml. of N-dimethyl formamide. The reaction mixture was stirred for 6 hours, then stood for additional 24 hours at room temperature. After adding 0.25 gram of sodium iodide, the reaction mixture was stirred again for 2 hours.

To this solution kept at 40° C., 100 ml. of dry acetone were added, then a precipitate was collected by centrifuge action, washed with acetone and dried over phosphorus pentaoxide to give 0.4 gram of dry solid. After extracting this solid 15 times with 15 ml. each of isopropyl alcohol, removal of solvents gave 0.30 gram (yield 60.7%) of monobenzyl 5'-adenosine diphosphate.

*Anal.*—Calcd., $C_{17}H_{20}N_5O_{10}P_2Na \cdot 2H_2O$: N, 12.17%. Found: N, 12.76%.

This monobenzyl 5'-adenosine diphosphate was derived to 5'-adenosine triphosphate which is important biochemically and pharmaceutically.

What we claim is:

1. In a process wherein a phosphite having the formula:

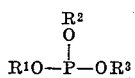

in which $R^1$, $R^2$, $R^3$ are selected from the group consisting of benzyl, p-nitrophenyl and alkyl having 1 to 4 carbon atoms, is added to a phosphate selected from the group consisting of monoalkyl phosphate, dialkyl phosphate, monobenzyl phosphate, dibenzyl phosphate, monophenyl phosphate, diphenyl phosphate, p-nitrophenyl phosphate, bis-paranitrophenyl phosphate, chlorophenyl phosphate, dichlorophenyl phosphate, and a nucleotide, said alkyl having 1 to 4 carbon atoms to produce the corresponding pyrophosphates, an improvement which comprises conducting the addition in the presence of at least one active methylene compound selected from the group consisting of chloro and bromo derivates of N-cyclohexyl cyanoacetamide, cyanoacetamide, malonamide, and alkyl cyanoacetate which alkyl has 1 to 4 carbon atoms, and a solvent for the phosphite and the active methylene compound, said solvent being non-reactive to enolphosphates formed by the Perkow reaction.

2. In a process wherein a phosphite having the formula:

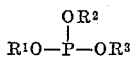

in which $R^1$, $R^2$ and $R^3$ are selected from the group consisting of an alkyl having 1 to 4 carbon atoms, benzyl and p-nitrophenyl, and a member selected from the group consisting of monoalkyl phosphate, dialkyl phosphate, monobenzyl phosphate, dibenzyl phosphate, monophenyl phosphate, diphenyl phosphate, p-nitrophenyl phosphate, bis-paranitrophenyl phosphate, chlorophenyl phosphate, dichlorophenyl phosphate are added together to produce the corresponding pyrophosphate, said alkyl being selected from the group consisting of methyl, ethyl, n-propyl, isopropyl, n-butyl and isobutyl, an improvement which comprises the addition being effected at a temperature of about −50° C. for 2–3 hours in the presence of at least one active methylene compound selected from the group consisting of chloro and bromo derivates of cyanoacetamide, malonamide, N-cyclohexyl cyanoacetamide, and alkyl cyanoacetate which alkyl has 1 to 4 carbon atoms.

3. In a process wherein a phosphite having the formula:

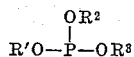

in which $R^1$, $R^2$, $R^3$ are selected from the group consisting of an alkyl having 1 to 4 carbon atoms, benzyl, and p-nitrophenyl, and a member selected from the group consisting of a nucleotide and nucleotide derivatives, are added to produce the corresponding pyrophosphate, an improvement which comprises the addition at room temperature for 20–48 hours in the presence of at least one derivative of an active methylene compound having substituted bromo and chloro atoms selected from the group consisting of cyanoacetamide, malonamide, and N-cyclohexyl cyanoacetate which alkyl has 1 to 4 carbon atoms.

References Cited by the Examiner

Cramer: "Angew. Chem." vol. 72, April 1960, pp. 236–249.

LEWIS GOTTS, *Primary Examiner.*